(12) United States Patent
Zhang et al.

(10) Patent No.: US 9,798,589 B2
(45) Date of Patent: Oct. 24, 2017

(54) EXPLOITING PARALLELISM IN EXPONENTIAL SMOOTHING OF LARGE-SCALE DISCRETE DATASETS

(71) Applicant: ORACLE INTERNATIONAL CORPORATION, Redwood Shores, CA (US)

(72) Inventors: Lei Zhang, Lexington, MA (US); Patrick Edward Aboyoun, Seattle, WA (US); Denis B. Mukhin, Marlborough, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/625,963

(22) Filed: Feb. 19, 2015

(65) Prior Publication Data
US 2015/0234686 A1 Aug. 20, 2015

Related U.S. Application Data

(60) Provisional application No. 61/942,503, filed on Feb. 20, 2014.

(51) Int. Cl.
*G06F 9/46* (2006.01)
*G06F 9/50* (2006.01)
(Continued)

(52) U.S. Cl.
CPC .......... *G06F 9/5083* (2013.01); *G06F 9/4881* (2013.01); *G06F 17/18* (2013.01); *G06F 17/30477* (2013.01)

(58) Field of Classification Search
None
See application file for complete search history.

(56) References Cited

U.S. PATENT DOCUMENTS 7,610,214 B1 * 10/2009 Dwarakanath ..... G06Q 30/0202
  705/7.31
7,739,143 B1 * 6/2010 Dwarakanath ..... G06Q 30/0202
  705/7.31
(Continued)

OTHER PUBLICATIONS

Kavulya et al. An analysis of Traces from a Production MapReduce Cluster, Carnegie Mellon University, 2009, 10 pages.*
(Continued)

*Primary Examiner* — Diem Cao
(74) *Attorney, Agent, or Firm* — Vista IP Law Group, LLP

(57) ABSTRACT

A system, and computer program product for large-scale data transformations. Embodiments include a smoothing engine within an R environment to configure at least one master task and at least two worker tasks. A chunk calculator receives a series of data values and divides the series of data values into portions of data values which are in turn assigned as workloads to at least two worker tasks. The worker tasks serve to calculate a first state value of a first one of the portions of data values, and calculate a second state value of a second one of the portions of data values. The workloads are selected such that calculating a second state value does not depend on the first state value. The results of the workload calculations are used to calculate a smoothing factor used to predict a trend.

20 Claims, 11 Drawing Sheets

(51) Int. Cl.
*G06F 9/48* (2006.01)
*G06F 17/30* (2006.01)
*G06F 17/18* (2006.01)

(56) References Cited

U.S. PATENT DOCUMENTS

| | | | | |
|---|---|---|---|---|
| 2002/0152305 | A1* | 10/2002 | Jackson | H04L 12/26 709/224 |
| 2010/0287029 | A1* | 11/2010 | Dodge | G06Q 30/0202 705/7.31 |
| 2013/0030759 | A1* | 1/2013 | Hao | G06F 17/18 702/179 |
| 2014/0215178 | A1* | 7/2014 | Li | G06F 9/5066 711/173 |
| 2014/0297665 | A1* | 10/2014 | Stevens | G06F 17/30516 707/754 |

OTHER PUBLICATIONS

Ravinder, Determining the optimal values of exponential Smoothing Constants—Does Solver Really Work?, Montclair State University, American Journal of Business Education, May/Jun. 2013, pp. 347-360.*

Sequin, Understanding Map Reduce, Jan. 2011, 6 pages.*

Adler et al, The ff package: Handling Large Data Sets in R with Memory Mapped pages of Binary Flat Fieles, George-August-Unversitat Gottingent Germany, 18 pages.*

C. C. Holt, "Forecasting seasonals and trends by exponentially weighted moving averages," *International Journal of Forecasting*, vol. 20, No. 1, pp. 5-10, 2004.

P. R. Winters, "Forecasting Sales by Exponentially Weighted Moving Averages," *Management Science*, vol. 6, No. 3, pp. 324-342, 1960.

E. S. Gardner, "Exponential smoothing: The state of the art," *Journal of Forecasting*, vol. 4, No. 1, pp. 1-28, 1985.

E. H. Bareiss, "Numerical solution of linear equations with Toeplitz and vector Toeplitz matrices," *Numerische Mathematik*, vol. 13, pp. 404-424, 1969.

Oracle, "Oracle R Enterprise" User's Guide, Release 1.4, Exploring Data, Preparing and Exploring Data in the Database, Feb. 2014, 29 pages.

* cited by examiner

EXPLOITING PARALLELISM IN EXPONENTIAL SMOOTHING OF LARGE-SCALE DISCRETE DATASETS

RELATED APPLICATIONS

The present application claims the benefit of priority to U.S. Patent Application Ser. No. 61/942,503, entitled "METHOD AND APPARATUS TO EXPLOIT PARALLELISM IN EXPONENTIAL SMOOTHING OF LARGE-SCALE DISCRETE DATASETS", filed Feb. 20, 2014, which is hereby incorporated by reference in their entirety

FIELD

The disclosure relates to the field of large-scale data transformations and more particularly to techniques for exploiting parallelism during smoothing and building a predictive model from a large-scale discrete dataset.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many enterprise problems use data collected over time. In some cases, the data is collected frequently and over a long period of time, resulting in many time-stamped observations. In situations such as in financial settings and/or in the telecommunications industry and/or in academia and so on, it is convenient to use an empirically-collected set of time-stamped data to derive a model, which model uses a smoothing function to represent the empirically-collected data. The derived model and smoothing function are used to forecast future observations.

Many model generation implementations are found in enterprise settings, including in statistical packages such as "JMP", "SPSS", and "R", however legacy implementations are deficient in at least three aspects. First, legacy implementations of time-series smoothing fail for large datasets (e.g., they run out of memory). Second, legacy implementations are either uncoupled or only loosely coupled to a database engine that is capable of storing large datasets. In addition, legacy implementations rely on algorithms that include a dependency on the calculation of a state in a previous time step when updating the state of the current time step. This step-to-step dependency found in legacy approaches prevents concurrent calculations of states in such legacy implementations.

None of the aforementioned legacy approaches achieve the capabilities of the herein-disclosed techniques for exploiting parallelism during smoothing of large-scale discrete datasets to build a predictive model. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for exploiting parallelism during smoothing of large-scale discrete datasets to build a predictive model.

Embodiments implemented in accordance with this disclosure result in embodiments that are fast (e.g., able to be parallelized so as to produce results in near-linear time), and are integrated with a database engine (e.g., a database engine that can handle large-scale datasets comprising billions of rows), and are integrated with one or more statistical packages so as to be convenient for a user.

Embodiments include a smoothing engine within an R environment to configure at least one master task and at least two worker tasks. A chunk calculator receives a series of data values and divides the series of data values into portions of data values which are in turn assigned as workloads to at least two worker tasks. The worker tasks serve to calculate a first state value of a first one of the portions of data values, and calculate a second state value of a second one of the portions of data values. The workloads are selected such that calculating a second state value does not depend on the first state value. The results of the workload calculations are used to calculate a smoothing factor used to predict a trend.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
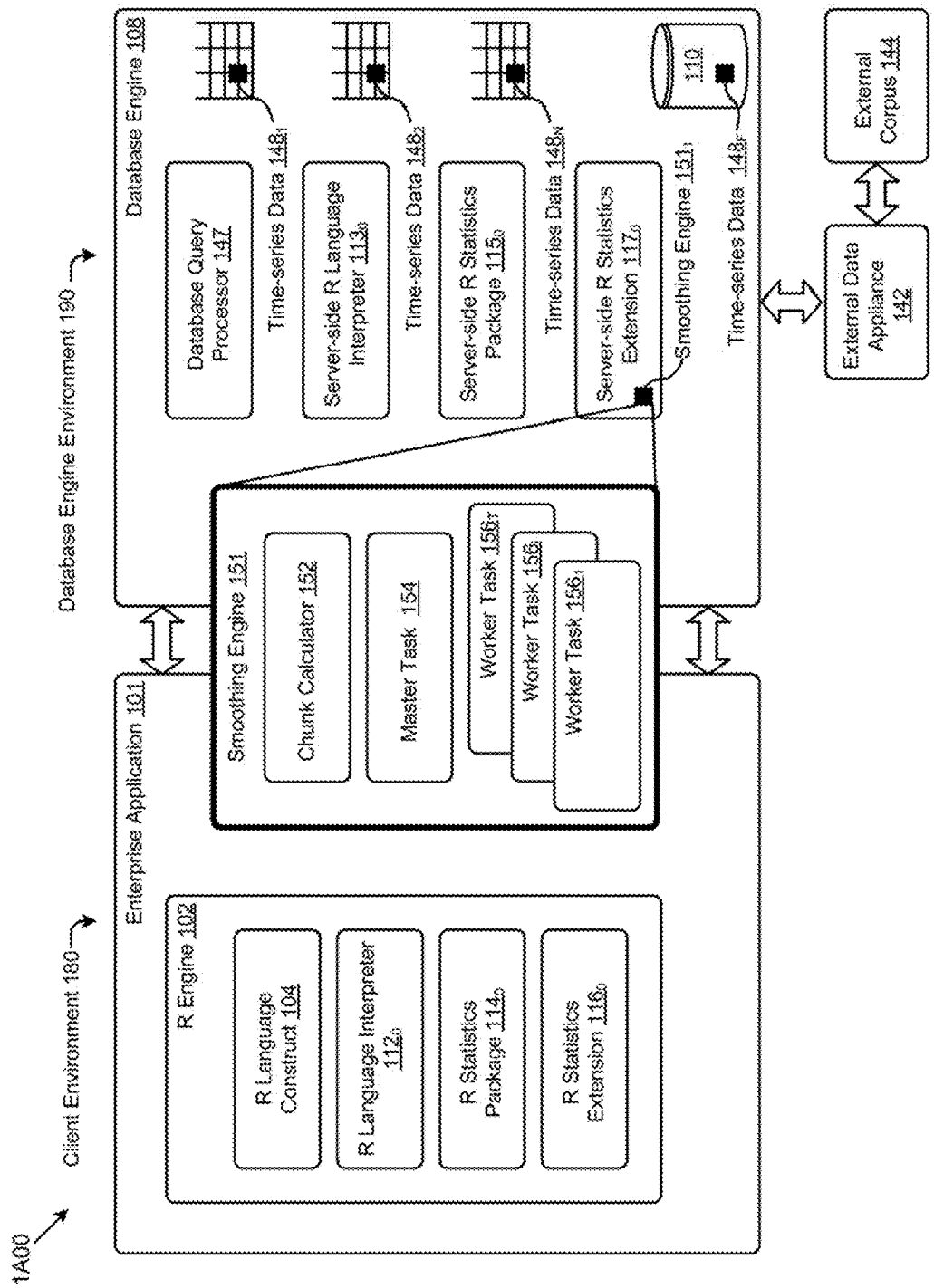
FIG. 1A depicts an environment having a relational database system that implements a smoothing engine to launch a swarm of worker tasks during smoothing of large-scale discrete datasets, according to some embodiments.

Embodiments of the present disclosure address the problem of smoothing of large-scale discrete datasets (e.g., time-series datasets). More particularly, disclosed herein and in the accompanying figures are exemplary environments, methods, and systems for exploiting parallelism during smoothing of large-scale discrete datasets to build a predictive model.

Overview

Various smoothing methods (e.g., exponential smoothing methods) have been used for developing trending models and for forecasting. Legacy calculations of the smoothing methods follow an iterative and/or sequential evaluation approach that is often prohibitively expensive and often fails in situations involving large-scale datasets. This situation is exacerbated by the explosion of easily accessible data (e.g., from mobile devices and from social networks) such that large-scale datasets become more and more prevalent. What is needed are scalable approaches to implement fast and efficient smoothing methods that present a smoothed data series (e.g., a time series) to a user to aid in human comprehension of the trend (if any) of the smoothed amalgamation of the data items as a set. Strictly as one example from the financial sector, a stock price might have a closing price on each trading day over a long time period (e.g., years), and those closing prices might be "all over the map". A user might want to perceive if there is a trend (e.g., increasing share price) or cycle (e.g., the stock price tanks every December). Moreover, users desire fast and efficient smoothing methods that take advantage of large database environments and/or that take advantage of built-in models, such as are found in the "R" language.

Several models are discussed infra, specifically a single exponential smoothing model and a double exponential smoothing model. The discussions include exemplary implementations of the smoothing models within an enterprise setting (e.g., within a database environment, or within an enterprise application setting). Some of the discussed implementations are suited for use with very large datasets, and yet are still fast (e.g., run times approaching linear time) and efficient (e.g., use memory conservatively). In particular, the shown map-reduce systems are applicable for large-scale datasets, and at least some of the disclosed map-reduce embodiments can be configured to calculate objective functions over the entire dataset. (e.g., see the objective function as given in EQ. 4).

A mathematical description and implementation of both the single exponential and double exponential smoothing techniques are further described in the following and in the appended figures.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts an environment 1A00 having a relational database system that implements a smoothing engine to launch a swarm of worker tasks during smoothing of large-scale discrete datasets.

As shown, a client environment 180 comprises an R engine 102 that communicates with a database engine environment 190 comprising a database engine 108. The database engine 108 includes a database 110 (e.g., a disk drive), and the database engine maintains tables. The database 110 and any tables contain discrete datasets (e.g., time-series data $148_1$, time-series data $148_2$, time-series data $148_N$, time-series data $148_F$, etc.). The shown database engine 108 comprises a database query processor for processing database language constructs (e.g., a query language statement, SQL code, etc.). In exemplary embodiments, the database engine 108 is in communication with an external corpus 144 through an external data appliance 142 (e.g., Hadoop). The shown external data appliance 142 comprises a database query processor for processing database language constructs (e.g., a query language statement, SQL code, etc.).

Referring to the client environment 180, an R engine 102 can be accessed by, or linked-in to, an enterprise application. The R engine 102 comprises engines for processing one or more instances of R language constructs 104 and for processing statistics, for example, using an R statistics package $114_0$. An R engine 102 implements an R language interpreter $112_0$. In the database engine environment, the database engine 108 comprises an instance of an R statistics package in the form of a server-side R language interpreter $113_0$ and an instance of an R statistics package in the form of a server-side R statistics package $115_0$. Illustrative embodiments further include one or more instances of a server-side R statistics extension $117_0$.

The shown server-side R statistics extension $117_0$ includes a smoothing engine $151_1$, which in turn implements an R interface between the smoothing engine and other R components. The smoothing engine implements a chunk calculator (see FIG. 2A), a master task 154, and worker tasks (e.g., worker task $156_1$, worker task $156_i$, worker task $156_T$, etc.). The smoothing engine is configured to access discrete datasets (e.g., time-series data $148_1$, time-series data $148_2$, time-series data $148_N$, time-series data $148_F$, etc.) and to divide constituent data points into smaller-sized portions or "chunks", which in turn are processed in parallel by a swarm of worker tasks (see FIG. 2A).

The aforementioned occurrence of the smoothing engine $151_1$ being situated within the server-side R statistics extension $117_0$ is merely one possibility. Other partitioning possibilities are discussed infra. In particular, the smoothing engine might be situated within an enterprise application 101, and/or within an R engine 102, and/or within a client-side instance of an R statistics extension $116_0$ as shown in FIG. 1B.

Figure 1B:
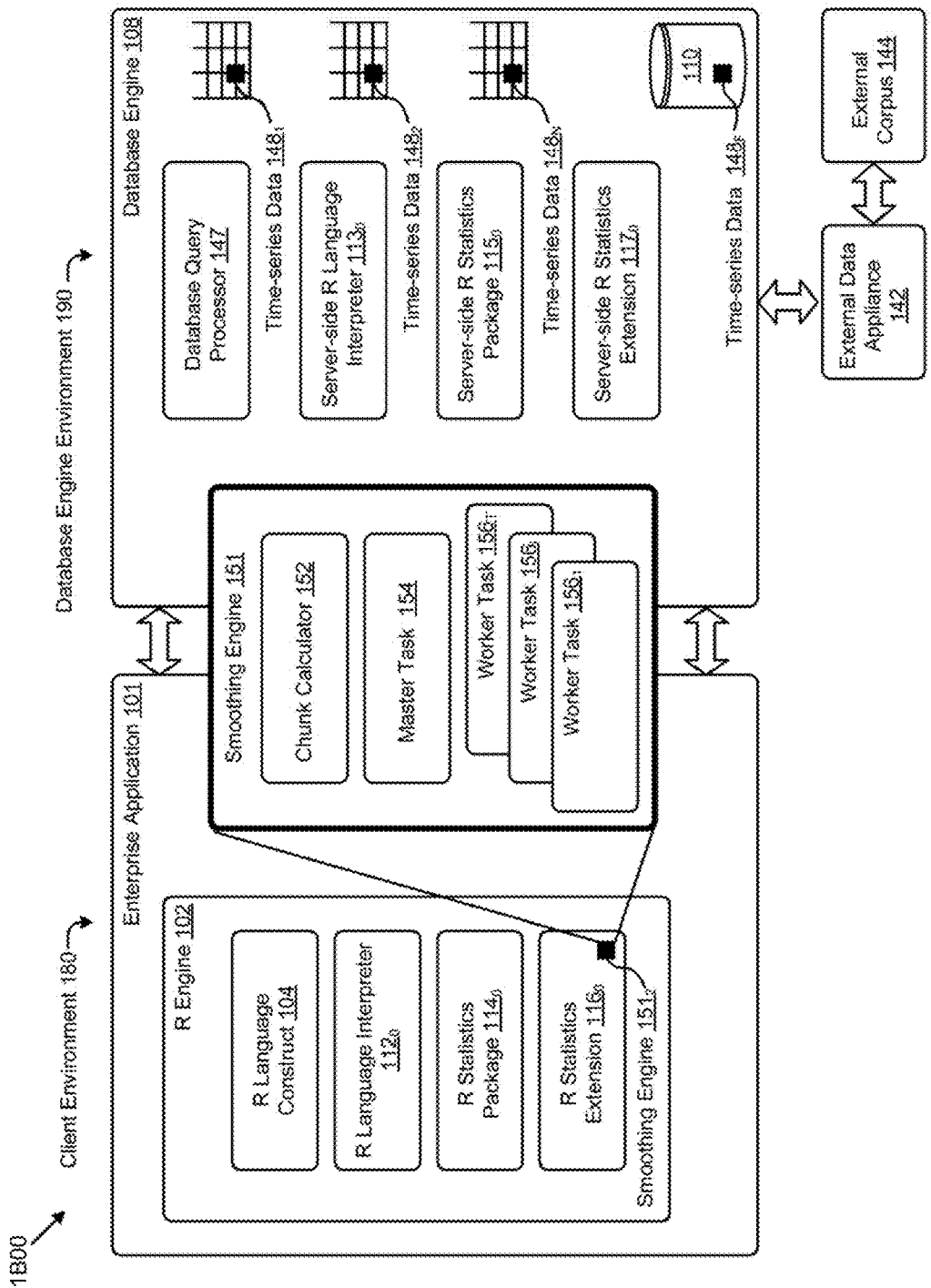
FIG. 1B depicts an environment having an enterprise application that implements a smoothing engine to launch a swarm of worker tasks during smoothing of large-scale discrete datasets, according to some embodiments.

FIG. 1B depicts an environment 1B00 having an enterprise application that implements a smoothing engine to launch a swarm of worker tasks during smoothing of large-scale discrete datasets. As an option, one or more instances of environment 1B00 or any aspect thereof may be implemented in the context of the architecture and functionality of the embodiments described herein. Also, the environment 1B00 or any aspect thereof may be implemented in any desired environment.

The environment 1B00 comprises a smoothing engine situated $151_2$ within an R statistics extension $116_0$, as shown. Components of the R statistics extension $116_0$ and/or any operational components of the enterprise application 101 can issue a query, which in turn is processed by the database query processor 147 of the database engine 108.

Processing of a query can result in portions (e.g., chunks) of large-scale discrete datasets being returned to a master task 154 and/or any one or more instances of a worker task 156. A chunk calculator 152 serves to determine the size of a chunk (e.g., how many data points comprise a chunk). The calculated size of a chunk can depend on many variables such as: the extent of the large-scale discrete dataset being processed, the size of each individual data item, the size of data (e.g., pointers, keys, etc.) to be carried with each respective individual data item, the size of memory available to worker tasks, and the size of the worker task code space, etc.

In some cases processing of a query can result in portions (e.g., chunks) of large-scale discrete datasets being accessed from an external corpus 144, possibly using an external data appliance 142. In some such cases, chunking operations can be performed within the external data appliance (see FIG. 4) before being provided to a master task 154 and/or its subordinate worker tasks.

An instance of a chunk calculator 152 (wherever located), an instance of a master task (wherever located), and its subordinate worker tasks (wherever located) execute cooperatively to implement smoothing of large-scale discrete datasets.

Sequential evaluation approaches become prohibitively expensive and often fail for large-scale datasets. When using a sequential evaluation approach (e.g., see EQ. 1, below), a next iteration cannot begin until the previous iteration has completed—this is a consequence that calculating a current time step depends on completion of the calculation of a previous time step. Discussed hereunder is a single exponential smoothing model in both sequential and parallel formulations. Farther below, a double exponential smoothing model is introduced.

Single Exponential Smoothing Model

Strictly as an example where the dataset comprises a series of observations over time, denote the observed time series by $x_t$, t=1, 2, . . . , N, and the level component in the smoothing model by $S_t$, for t=1, 2, . . . , N. The smoothing equation for $S_t$ is:

$$S_t = \alpha x_{t-1} + (1-\alpha)S_{t-1}, t>1, 0<\alpha\leq 1 \quad (EQ. 1)$$

where $\alpha$ is the smoothing factor to be determined. The level $S_t$ should be initialized at t=1.

Choose the initialization state value being:

$$S_1 = x_1 \quad (EQ. 2)$$

By recursive substitution, the smoothing equation EQ. (1) can be easily transformed to a direct form:

$$S_t = \alpha[x_{t-1} + (1-\alpha)x_{t-2} + (1-\alpha)^2 x_{t-3} + \ldots] + (1-\alpha)^{t-2} x_1 \quad (EQ. 3)$$

Next, the direct form equation EQ. (3) will be used to realize parallelism for large-scale time series. In order to solve for the smoothing factor $\alpha$, the sum of squared error (SSE) for the entire time series is minimized:

$$\min_{0<\alpha\leq 1} \Sigma_t (S_t - x_t)^2 \quad (EQ. 4)$$

The above exponential smoothing employs a one-variable non-linear optimization objective function EQ. (4). The objective function in EQ. (4) can be calculated sequentially using EQ. (1). However, for large-scale time series, this sequential calculation becomes prohibitively expensive, and thus motivates a scalable parallel algorithm, for example by using map-reduce techniques.

Figure 2A:
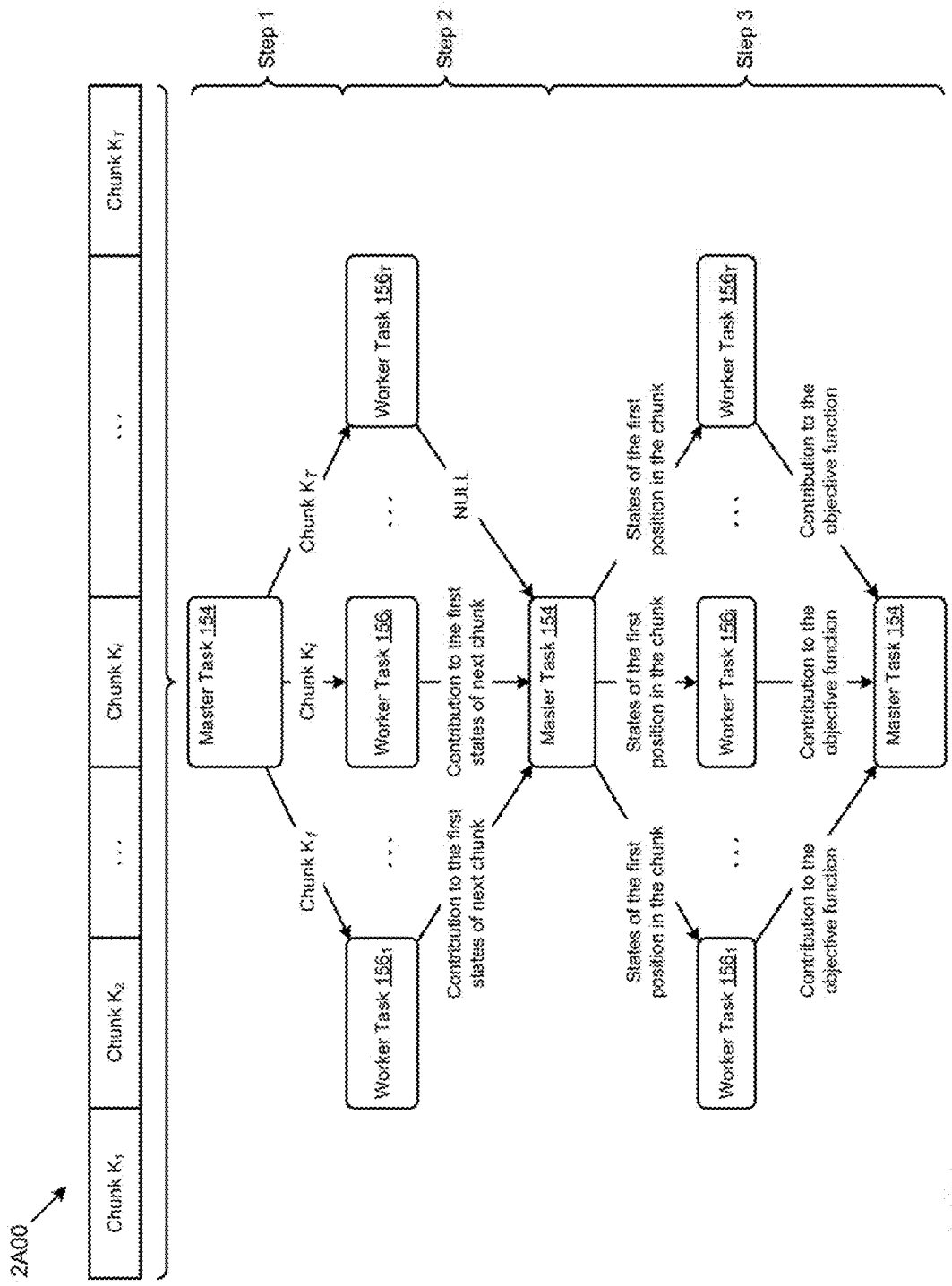
FIG. 2A depicts a multi-step flow to implement map-reduce techniques for exploiting parallelism during smoothing of large-scale discrete datasets to build a predictive model, according to some embodiments.

FIG. 2A depicts a multi-step flow 2A00 to implement map-reduce techniques for exploiting parallelism during smoothing of large-scale discrete datasets to build a predictive model. As an option, one or more instances of multi-step flow 2A00 or any aspect thereof may be implemented in the context of the architecture and functionality of the embodiments described herein. Also, the multi-step flow 2A00 or any aspect thereof may be implemented in any desired environment.

As discussed above a chunk calculator determines the size and extent of chunks of data (e.g., chunk $K_1$, chunk $K_2$, chunk $K_T$, etc.). The shown multi-step flow commences to operate on the chunks. The multi-step flow includes the steps as are discussed in the following STEP subheadings.

Step 1

The master task 154 divides the dataset into a number of chunks (e.g., denoted by T) in accordance with the chunk size and chunk number as was determined by the chunk calculator. The chunk calculator determines the chunk size and chunk number based on any of the aforementioned variables, and may consider the physical characteristics of the operating environment. For example, a chunk calculator may determine a size of a chunk such that each chunk fits into the memory available to the workers (e.g., worker task $156_1$, worker task $156_i$, worker task $156_T$, etc.). A master task 154 then assigns one or more chunks to the worker tasks. The notation used hereunder denotes the ith chunk by $K_i$, and the continuous dataset series assigned to chunk $K_i$ is denoted by $x_{i,1}, x_{i,2}, \ldots, x_{i,L_i}$, where $L_i$ is the length of the dataset series in $K_i$.

Step 2

This step includes a calculation of the state S at the first position of each chunk using EQ. (3). According to EQ. (3), each chunk can independently calculate its own contributions to the first positions of the other chunks with larger indices. For example, the chunk $K_i$ should calculate its own contribution to the state $S_{j,1}$ (j>i), which is at the first position of the jth chunk, and then pass all these partial contributions to the master task for assembling. In some cases, the chunk $K_i$ can calculate only for the first position of the chunk $K_{i+1}$ because the difference of its contributions to the other chunks is only a factor of $(1-\alpha)^l$, where the exponent l is an integer determined by the distance between the first positions. After the workers pass all their contributions to the master task, the master task assembles the parts according to EQ. (3) and yields the states $S_{1,1}, S_{2,1}, \ldots, S_{T,1}$ for the first positions of all the chunks.

Step 3

The master task assigns the calculated states $S_{1,1}, S_{2,1}, \ldots, S_{T,1}$ for the first position of each chunk back to its own chunk. With the first state, each chunk is able to independently calculate the rest of its states using the smoothing equation EQ. (1) iteratively and, meanwhile, calculate and sum up the squared error in EQ. (4), then send the error value to the master task. The master task sums up all the squared errors collected from the workers and reduces it to the value of the objective function.

As shown and described, this algorithm is of O(N) complexity both in time and memory.

In some cases, smoothing of large-scale discrete datasets uses a double exponential smoothing factor objective function, which is now briefly discussed.

Double Exponential Smoothing Model

The double exponential smoothing technique uses a trend component $b_t$ to capture the time-varying trend in the observed time series, as well as the level component $S_t$, to capture the time-varying mean in the time series. The smoothing equations for the level and trend components become:

$$S_t = \alpha x_t + (1-\alpha)(S_{t-1} + b_{t-1}) \quad t>1, 0<\alpha\le 1 \quad \text{(EQ. 5)}$$

$$b_t = \beta(S_t - S_{t-1}) + (1-\beta)b_{t-1} \quad t>1, 0<\beta\le 1 \quad \text{(EQ. 6)}$$

The to-be-determined smoothing factors $\alpha$ and $\beta$ are in the range of 0 to 1. EQ. (7) and EQ. (8) initialize the level and trend components as:

$$S_1 = x_1 \quad \text{(EQ. 7)}$$

$$b_1 = x_2 - x_1 \quad \text{(EQ. 8)}$$

The smoothing factors can be obtained by minimizing the sum of squares of the one-step-ahead errors:

$$\min_{\substack{0<\alpha\le 1\\0<\beta\le 1}} \Sigma_t (S_{t-1} + b_{t-1} - x_t)^2 \quad \text{(EQ. 9)}$$

In the calculation of the objective function in EQ. (9), the smoothing states $S_t$ and $b_t$ can be computed in sequence using the smoothing equations EQ. (5) and EQ. (6). However, the sequential calculation does not scale for large-scale datasets. An approach to calculate the smoothing states without having dependencies on the states of the previous time steps is desired in order to evaluate the objective function in parallel. For this purpose, the following linear equation is derived for calculating the level component:

$$s = Cx + C_0 x_0 \quad \text{(EQ. 10)}$$

where s, x, and $x_0$ are the vectors of the level component and the observed time series, and they are:

$$s = [S_3, S_4, S_5, \ldots, S_N]^T \quad \text{(EQ. 11)}$$

$$x = [x_3, x_4, x_5, \ldots, x_N]^T \quad \text{(EQ. 12)}$$

$$x_0 = [x_1, x_2]^T \quad \text{(EQ. 13)}$$

The matrix C is a lower-triangular Toeplitz matrix in which each diagonal from left to right is constant, as is shown here:

$$C = \begin{pmatrix} c_3 & 0 & 0 & & 0 \\ c_4 & c_3 & 0 & \ldots & 0 \\ c_5 & c_4 & c_3 & & 0 \\ & \vdots & & \ddots & \vdots \\ c_{N-2} & c_{N-3} & c_{N-4} & & 0 \\ c_{N-1} & c_{N-2} & c_{N-3} & \ldots & 0 \\ c_N & c_{N-1} & c_{N-2} & & c_3 \end{pmatrix} \quad \text{(EQ. 14)}$$

The matrix C only requires to store the first column. The matrix $C_0$ is a two-column matrix with the first column denoted as u and the second column denoted as v:

$$C_0 = [u, v] \quad \text{(EQ. 15)}$$

The vectors u and v are defined as:

$$u = [u_3, u_4, u_5, \ldots, u_N]^T \quad \text{(EQ. 16)}$$

$$v = [v_3, v_4, v_5, \ldots, v_N]^T \quad \text{(EQ. 17)}$$

The entries $c_i$, $u_i$ and $v_i$ (i=4, 5, . . . , N) can be calculated in an identical way, using a new variable $q_i$ to represent $c_i$, $u_i$ or $v_i$. The new variable $q_i$ could be calculated as follows:

$$q_i = (1-\alpha)[p_{i-1} + (1+\beta)q_{i-1}], i=4,5,\ldots,N \quad \text{(EQ. 18)}$$

$$p_i = (1-\beta)p_{i-1} - \beta^2 q_{i-1}, i=4,5,\ldots,N \quad \text{(EQ. 19)}$$

where $p_i$ is an auxiliary variable. For calculating $c_i$, the initial values at t=3 are:

$$q_3 = \alpha; p_3 = 0 \quad \text{(EQ. 20)}$$

For calculating $u_i$, the initial values are:

$$q_3 = \alpha - 1; p_3 = \beta - 1 \quad \text{(EQ. 21)}$$

For calculating $v_i$, the initial values are:

$$q_3 = 2(1-\alpha); p_3 = 1 - 2\beta \quad \text{(EQ. 22)}$$

Once the matrices C and $C_0$ are stamped, to calculate the vector s is basically a matrix-vector multiplication using EQ. (10), which can be easily parallelized. The next section explains in detail that none of the above matrices in EQ. (10) are required to store before the matrix-vector multiplication.

The trend component can be obtained in a similar manner. The following is a sample linear equation for computing the trend:

$$b = C_b x + C_{b0} x_0 \quad \text{(EQ. 23)}$$

The vector b is defined as:

$$b = [b_3, b_4, b_5, \ldots, b_N]^T \quad \text{(EQ. 24)}$$

The matrix $C_b$ is another lower-triangular matrix, with a similar shape to EQ. (14); denote its entry as $c_{b,i}$. The matrix $C_{b0}$ is similar to the matrix $C_0$; denote its entry as $u_{b,i}$ and $v_{b,i}$ for the first and second column, respectively. The entries $c_{b,i}$, $u_{b,i}$ and $v_{b,i}$ (i=4, 5, . . . , N) can be calculated similarly; thus, use a new variable $q_{b,i}$ to represent $c_{b,i}$, $u_{b,i}$ or $v_{b,i}$, and it could be calculated as the following:

$$q_{b,i} = \beta(q_i - q_{i-1}) + (1-\beta)q_{b,i-1}, i=4,5,\ldots,N \quad \text{(EQ. 25)}$$

where $q_i$ is the corresponding entry $c_i$, $u_i$ or $v_i$. For example, the entry $c_{b,i}$ could be calculated in a sequence as:

$$c_{b,i} = \beta(c_i - c_{i-1}) + (1-\beta)c_{b,i-1}, i=4,5,\ldots,N \quad \text{(EQ. 26)}$$

where $c_i$ is the entry in the matrix C in EQ. (14). The initial value at t=3 in the calculation of $c_{b,i}$ is:

$$q_{b,3} = \alpha\beta \quad \text{(EQ. 27)}$$

For calculating $u_{b,i}$, the initial value is:

$$q_{b,3} = \alpha\beta - 1 \quad \text{(EQ. 28)}$$

For calculating $v_{b,i}$, the initial value is:

$$q_{b,3} = 1 - 2\alpha\beta \quad \text{(EQ. 29)}$$

Once the vectors s and b are obtained, the objective function in EQ. (9) can be calculated.

The sequential calculation of the objective function in EQ. (9) can be done using the smoothing equations EQ. (5) and EQ. (6). However, a scalable parallel algorithm is often desired for very large-scale datasets. The following paragraphs describe a parallel, two-shot map-reduce algorithm for large-scale datasets to calculate the objective function in EQ. (9).

Figure 2B:
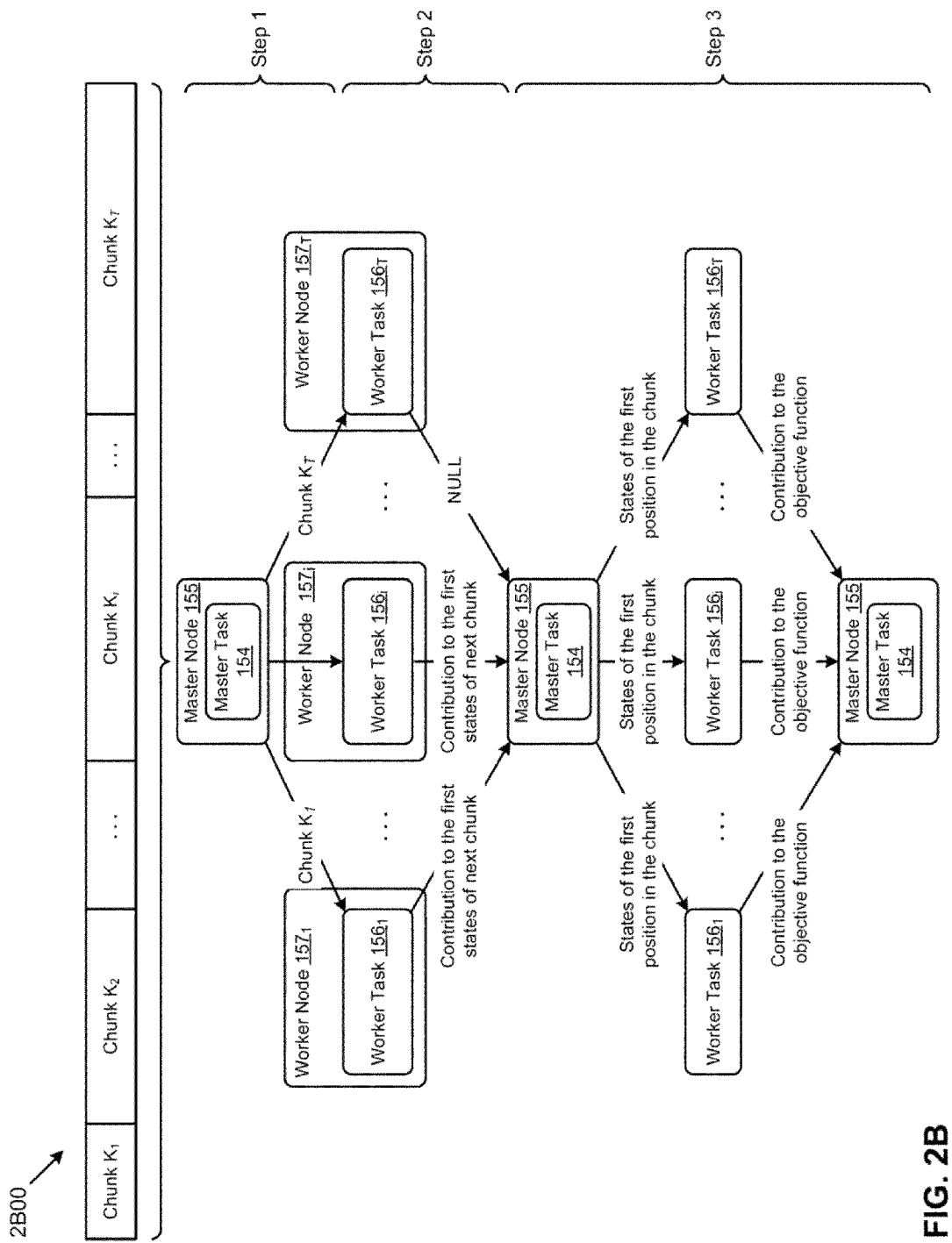
FIG. 2B depicts partitioning of a multi-node flow to implement two-shot map-reduce techniques for exploiting parallelism for smoothing of large-scale discrete datasets, according to some embodiments.

FIG. 2B depicts partitioning of a multi-node flow 2B00 to implement two-shot map-reduce techniques for exploiting parallelism using multiple computing nodes for smoothing of large-scale discrete datasets. As an option, one or more instances of multi-node flow 2B00 or any aspect thereof may be implemented in the context of the architecture and functionality of the embodiments described herein. Also, the multi-node flow 2B00 or any aspect thereof may be implemented in any desired environment.

As shown in FIG. 2B, multi-node flow 2B00 is implemented over a plurality of nodes, and processing of a task within a node includes the steps as are discussed in the following STEP subheadings.

Step 1

The master task (e.g., implemented within master node 155) divides the time series continuously into a number of chunks (the number of chunks is denoted by T), making sure that each chunk fits into the memory of the workers, and assigns the chunks to the workers. Denote the ith chunk by $K_i$ and the continuous dataset series is assigned to $K_i$ by $x_{i,1}$, $x_{i,2}, \ldots, x_{i,L_i}$, where $L_i$ is the length of the dataset series in $K_i$. One approach to dividing the datasets (binning process) into chunks involves even distribution. However, according to step 2, the primary work load tapers from $K_1$ to $K_T$. Therefore, the chunk size should be monotonically increasing from $K_1$ to $K_T$ (e.g., to optimize the parallel performance).

Step 2

The shown worker tasks, namely worker task $156_1$, worker task $156_i$, worker task $156_T$, (implemented within worker node $157_1$, worker node $157_i$, worker node $157_T$, respectively) execute to calculate the states S and b at the first position of each chunk using EQ. (10) and EQ. (23). Note that the first chunk $K_1$, which includes $x_1$ and $x_2$, would contribute to the calculation of $C_0 x_0$ and part of Cx in EQ. (23), and $C_{b0} x_0$ and part of $C_b x$ in EQ. (23). The other chunks would contribute to part of Cx in EQ. (10) and part of $C_b x$ in EQ. (23). Each chunk corresponds to a submatrix in C or $C_b$. Since the entries in the matrices in EQ. (10) and EQ. (23) are not immediately available, each chunk is required to stamp the corresponding submatrix using EQ. (18), EQ. (19) and EQ. (25) at the same time as performing a matrix-vector multiplication. Because of the property of the Toeplitz matrix, and since only the states at the first position of each chunk are required, each chunk is required to calculate only the first column of the corresponding submatrix, and vector dot products are executed instead of the matrix-vector multiplication. Therefore, the cost of this step is of linear complexity; run times are proportional to N. After all the workers calculate and pass their contributions to the master, the master task assembles the parts according to EQ. (10) and EQ. (23) and yields the states $S_{1,1}$, $S_{2,1}, \ldots, S_{T,1}$ and $b_{1,1}, b_{2,1}, \ldots, b_{T,1}$ for the first positions of all the chunks.

Step 3

The master task assigns the calculated states $S_{1,1}$, $S_{2,1}, \ldots, S_{T,1}$ and $b_{1,1}, b_{2,1}, \ldots, b_{T,1}$ for the first position of each chunk back to its own chunk. With the first states, each chunk can independently calculate the rest of its states using the smoothing equations EQ. (5) and EQ. (6) and, meanwhile, calculate and sum up the squared error in EQ. (9), then send the error value to the master task. The master task sums up all the squared errors collected from the workers and reduces to the value of the objective function. One technique pertinent to EQ. (9) relates to the one-step-ahead error. There is a one-shift in index when computing the error. Hence, in the reduce step, the technique passes a bit of extra data from each worker task for calculating the first and last one-step-ahead error in each chunk by the master.

As can be seen, this partitioning eliminates dependencies on the calculation of states $S_{i-1}$ and $B_{i-1}$ when updating the states $S_i$ and $B_i$. The three step algorithm discussed as pertaining to the multi-node flow 2B00 is of approximately O(N) complexity both in time and memory.

The functioning of the host computing system can be further improved by performing load balancing of the loads (e.g., composition of chunks) when making assignments of workloads to worker tasks. In many practical cases, the density of observations may vary over the observation collection time period. Some time periods may exhibit a high density of observations of a unit of time, while other time periods may exhibit a sparse density of observations over a unit of time. Load balancing addresses variations of density over time, and some exemplary implementations are shown and discussed as pertains to FIG. 2C.

Figure 2C:
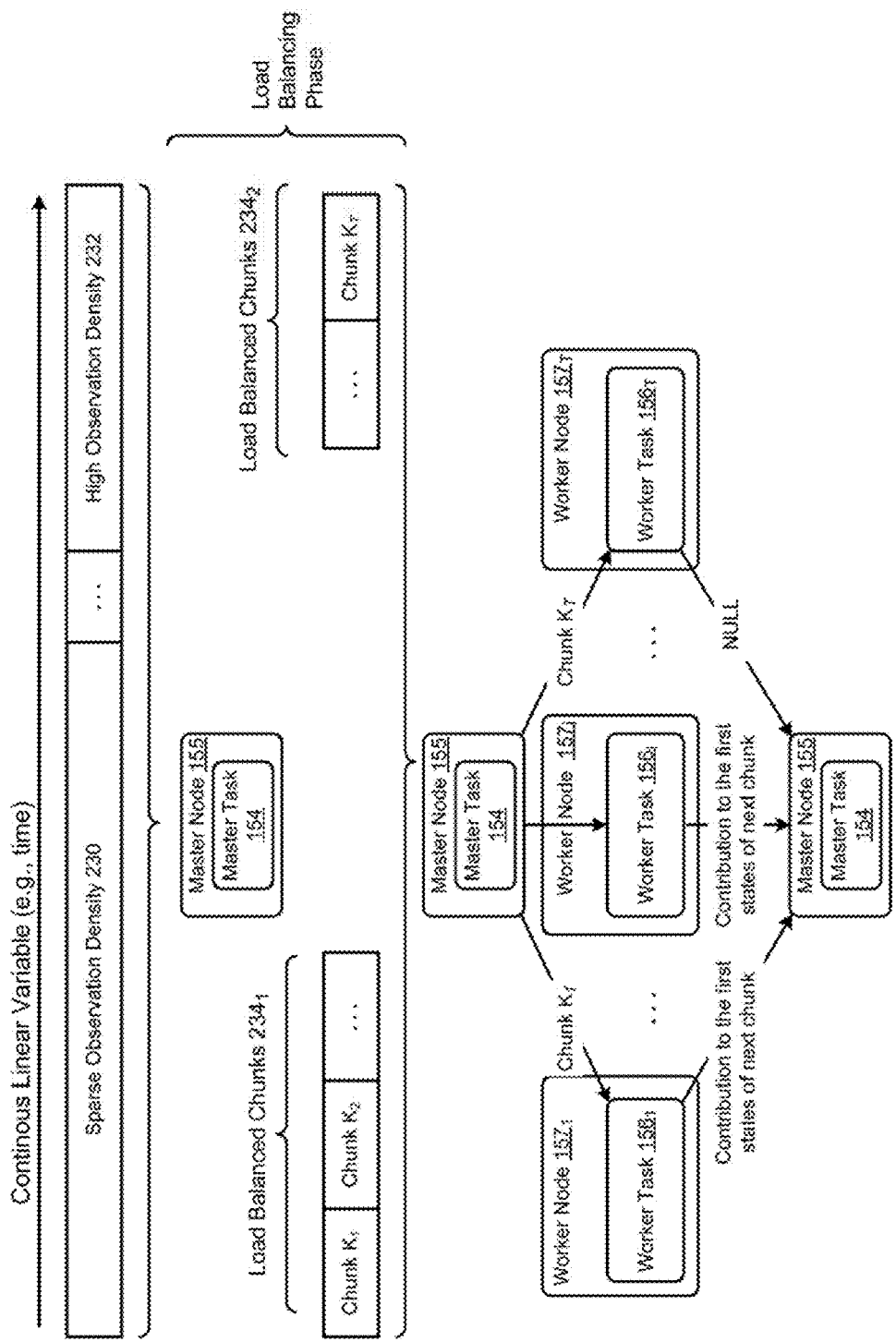
FIG. 2C depicts load balancing within a multi-node flow to implement two-shot map-reduce techniques for exploiting parallelism for smoothing of large-scale discrete datasets, according to some embodiments.

FIG. 2C depicts load balancing within a multi-node flow to implement two-shot map-reduce techniques for exploiting parallelism for smoothing of large-scale discrete datasets.

As shown, observations are taken over an epoch of time comprising multiple periods within the epoch. Some time periods within the epoch may exhibit a sparse density of observations of a unit of time (e.g., sparse observation density 230), while other time periods may exhibit a high density of observations over a unit of time (e.g., high observation density 232). In this embodiment, load balancing is accomplished by grouping relatively the same number of observations into each chunk (e.g., see load balanced chunks $234_1$ and load balanced chunks $234_2$). Each relatively same sized chunk is assigned by master task 154 to a relatively same-sized worker node.

In some cases one worker node is more capable (e.g., high CPU speed, more memory, etc.) and a master node might assign relatively more (or fewer) observations to a respective more capable (or less capable) worker node.

Figure 3:
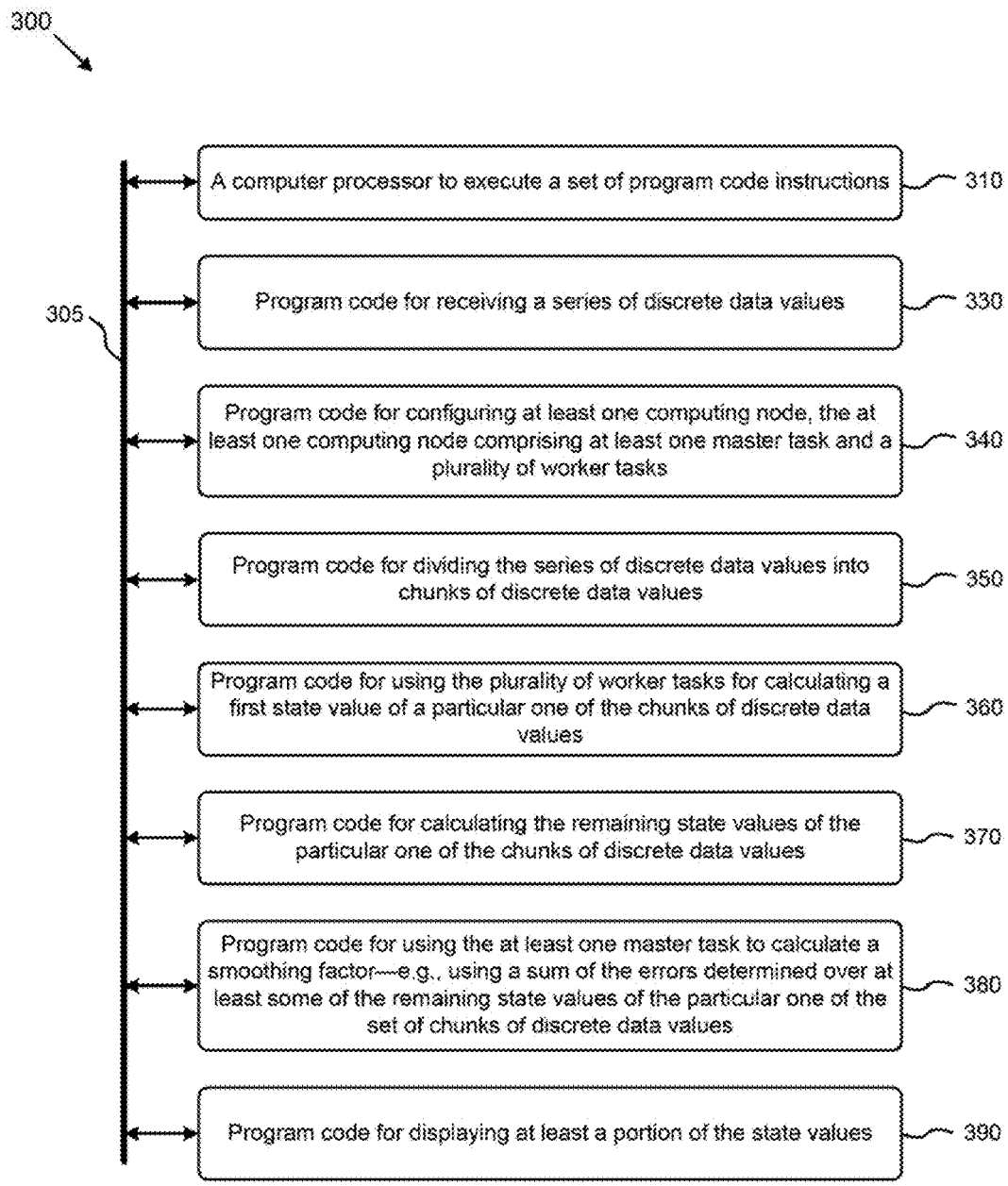
FIG. 3 is a flowchart showing a collection of operations organized to implement map-reduce techniques for exploiting parallelism during smoothing of large-scale discrete datasets to build a predictive model, according to some embodiments.

FIG. 3 is a flowchart of a system 300 showing a collection of operations organized to implement map-reduce techniques for exploiting parallelism during smoothing of large-scale discrete datasets to build a predictive model. As an option, one or more instances of system 300 or any aspect thereof may be implemented in the context of the architecture and functionality of the embodiments described herein. Also, the system 300 or any aspect thereof may be implemented in any desired environment.

As shown, system 300 comprises at least one processor and at least one memory, the memory serving to store program instructions corresponding to the operations of the system. As shown, an operation can be implemented in whole or in part using program instructions accessible by a module. The modules are connected to a communication path 305, and any operation can communicate with other operations over communication path 305. The modules of the system can, individually or in combination, perform method operations within system 300. Any operations performed within system 300 may be performed in any order unless as may be specified in the claims.

The embodiment of FIG. 3 implements a portion of a computer system, shown as system 300, comprising a computer processor to execute a set of program code instructions (see module 310) and modules for accessing memory to hold program code instructions to implement a process, the process comprising: receiving a series of discrete data values (see module 330); configuring at least one computing node, the at least one computing node comprising at least one master task and a plurality of worker tasks (see module 340); dividing the series of discrete data values into chunks of discrete data values (see module 350); using the plurality of worker tasks for calculating a first state value of a particular one of the chunks of discrete data values (see module 360); calculating the remaining state values of the particular one of the chunks of discrete data values (see module 370); using the at least one master task to calculate a smoothing factor— e.g., using a sum of the errors determined by at least the remaining state values of the particular one of the set of chunks of discrete data values (see module 380), and displaying at least a portion of the state values (see module 390).

Figure 4:
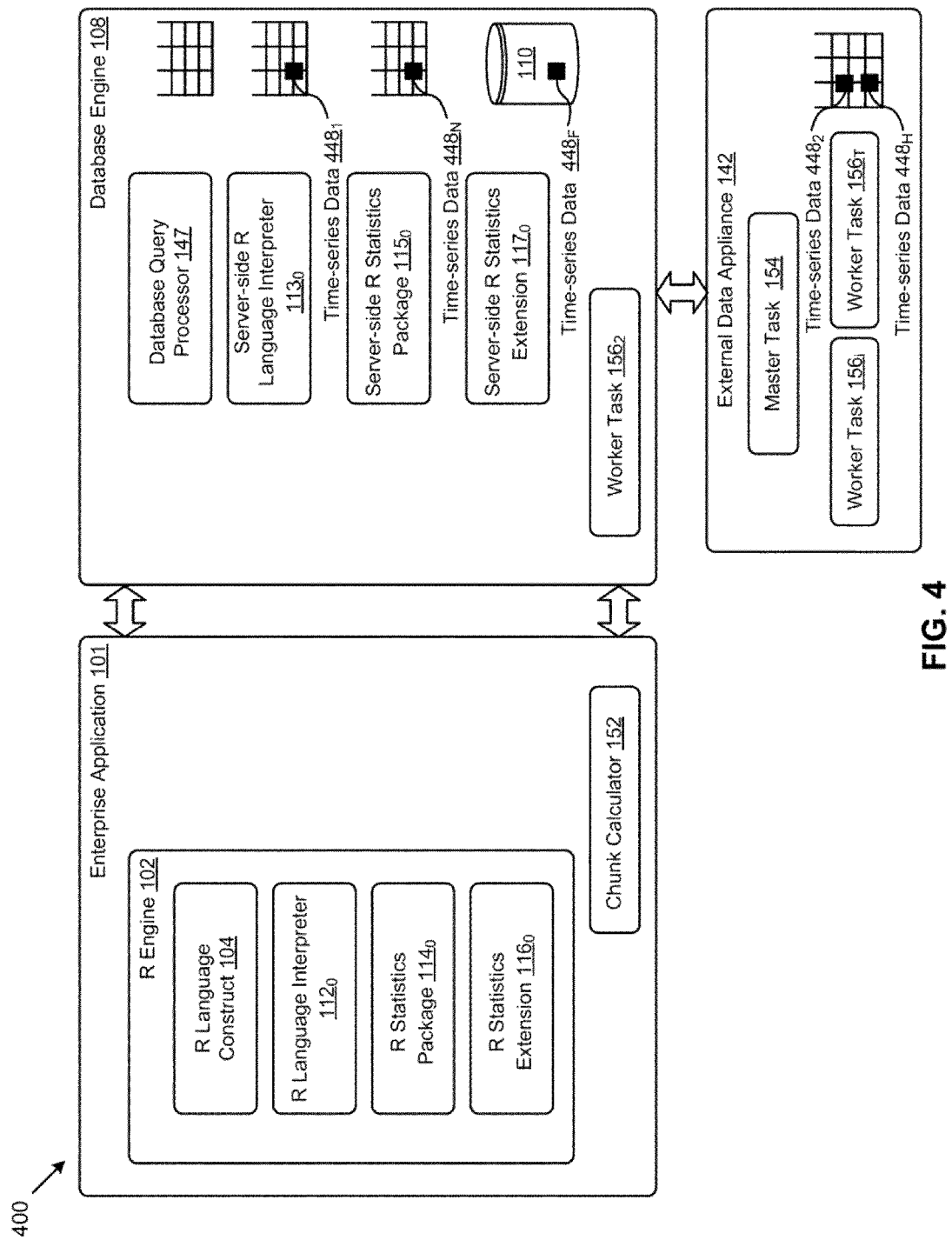
FIG. 4 is an example partitioning used to implement map-reduce techniques during smoothing of large-scale discrete datasets, according to some embodiments.

FIG. 4 is a partitioning 400 used to implement map-reduce techniques during smoothing of large-scale discrete datasets. As an option, one or more instances of partitioning 400 or any aspect thereof may be implemented in the context of the architecture and functionality of the embodiments described herein. Also, the partitioning 400 or any aspect thereof may be implemented in any desired environment.

As shown in FIG. 4, the partitioning implements a chunk calculator 152 within the enterprise application, and implements a master task 154 and several worker tasks in an external data appliance 142. Strictly as an example, one worker task $156_2$ is implemented within the shown database engine 108.

In this example, time-series data $448_2$ and time-series data $448_F$ are resident at or accessible to the external data appliance 142, however time-series data can come from any repository, including from within the database engine 108.

Figure 5A:
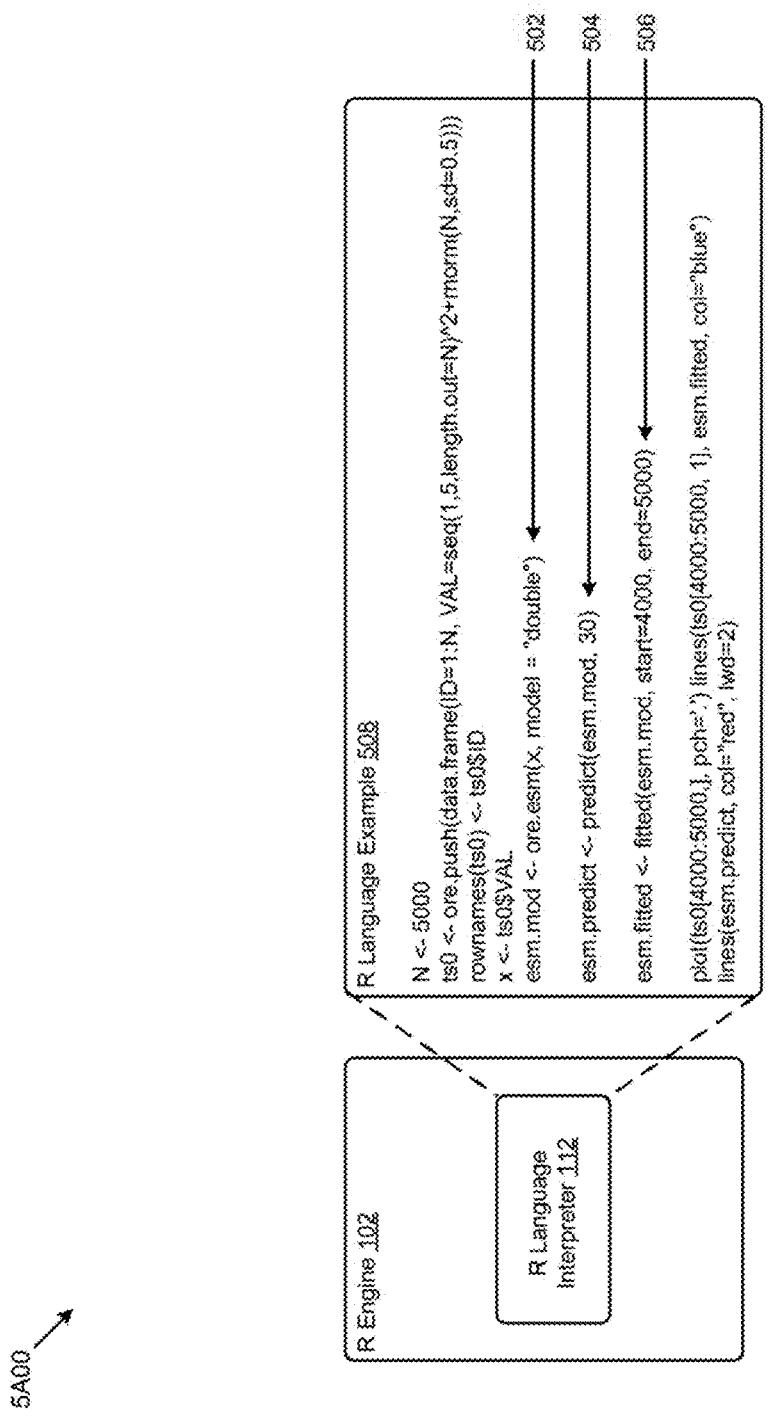
FIG. 5A depicts an example usage of 'R' code to implement map-reduce techniques for exploiting parallelism during smoothing of large-scale discrete datasets to build a predictive model, according to some embodiments.

FIG. 5A depicts a usage 5A00 of 'R' code to implement map-reduce techniques for exploiting parallelism during smoothing of large-scale discrete datasets to build a predictive model. As an option, one or more instances of usage 5A00 or any aspect thereof may be implemented in the context of the architecture and functionality of the embodiments described herein. Also, the usage 5A00 or any aspect thereof may be implemented in any desired environment.

As shown in FIG. 5A, the usage of R code is presented as an R language example 508. The R language interpreter 112 can parse the shown R code and produce a plot (e.g., see FIG. 5C).

The given R code includes an R function (e.g., the shown "ore.esm" call of function 502) to build a smoothing model for a series of observations given in an ordered object. The function 502 can operate on time series data (e.g., time-based observations are evenly spaced by a fixed interval), or transactional data (e.g., sequenced observations are not necessarily equally spaced in time). The function can aggregate the transactional data by a specified time interval, as well as handle missing values using a specified method, before entering the modeling phase. The predict function 504 serves to predict the trend of the exponential smoothing model built by the ore.esm function.

The shown code fragment within the R language example builds interim results (see FIG. 5B) to form a double exponential smoothing model on a time-series dataset. The prediction function and fitted function 506 are invoked to generate the predictions and the fitted values, respectively. FIG. 5C shows the observations, fitted values, and predictions.

Figure 5B:
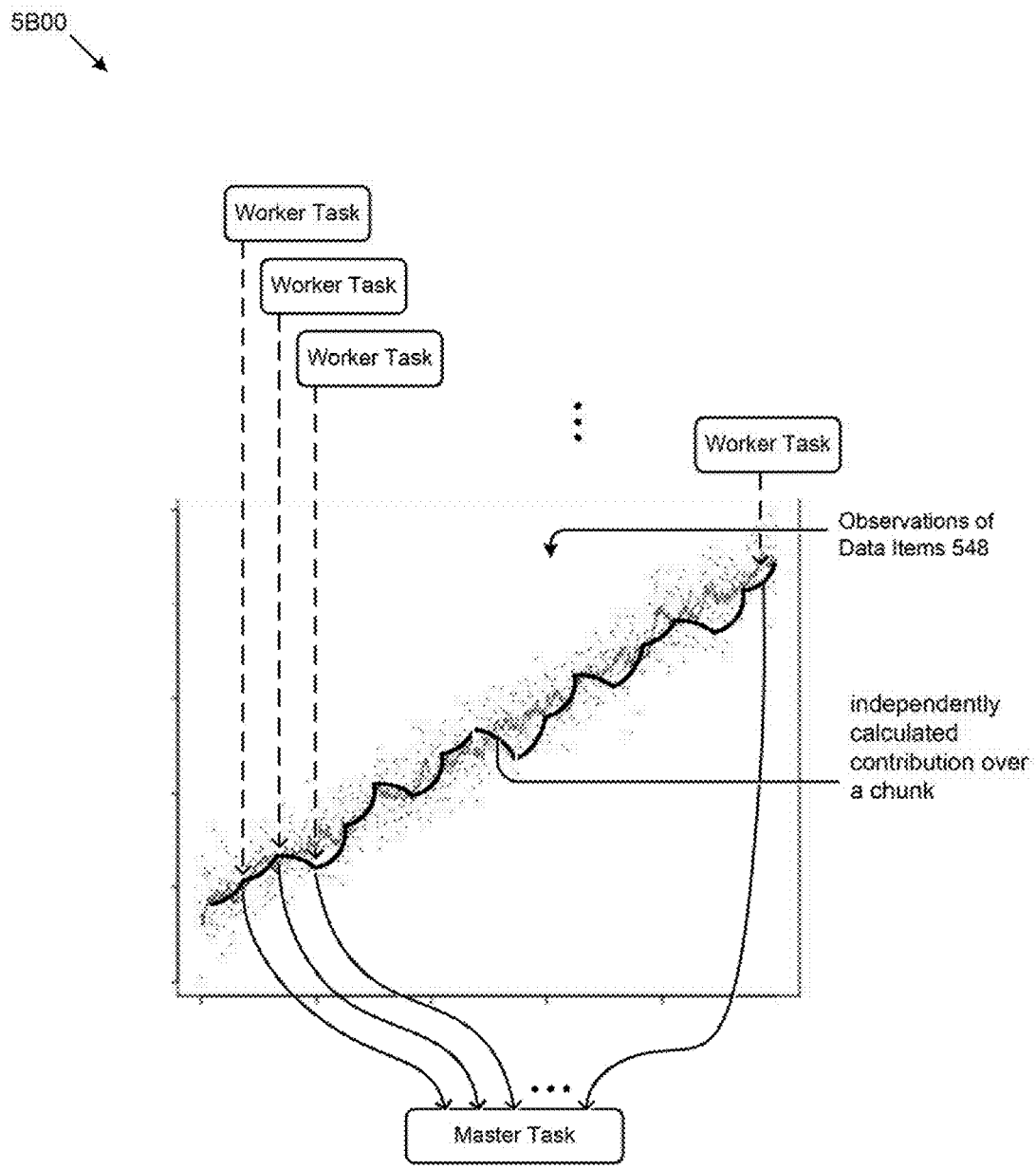
FIG. 5B depicts interim results from worker tasks used to implement map-reduce techniques for exploiting parallelism during smoothing of large-scale discrete datasets, according to some embodiments.
Figure 5C:
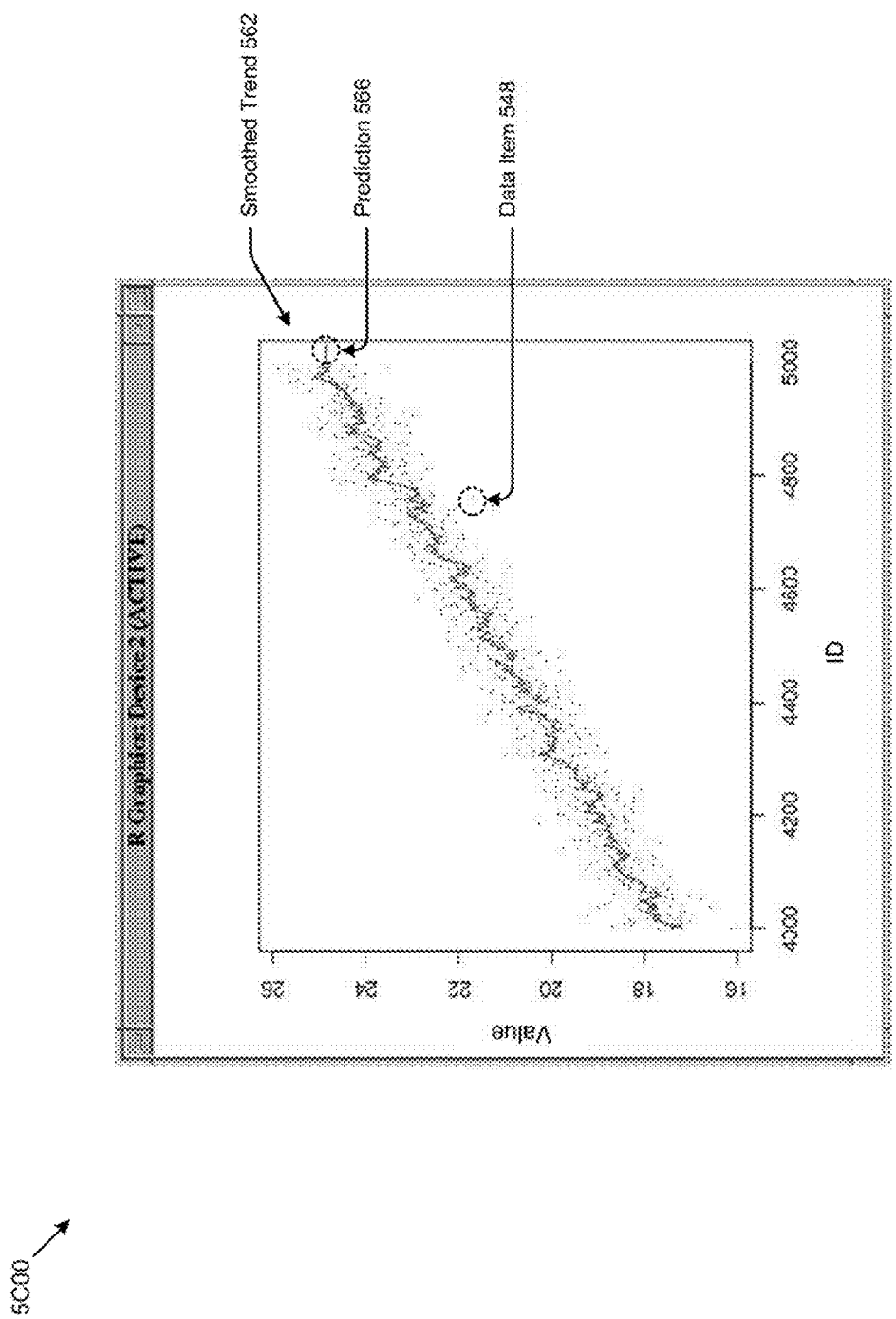
FIG. 5C depicts a plot to display a trend given by smoothing over a large set of data items, according to some embodiments.

FIG. 5B depicts interim results from worker tasks used to implement map-reduce techniques for exploiting parallelism during smoothing of large-scale discrete datasets.

As shown, each worker task performs calculations over an assigned portion of observations (e.g., data items 548), and each worker task contributes a portion of the trend by independently calculating a trend segment over a chunk. In the case that a master task assigns T chunks to T worker tasks, the first worker task contributes a portion of the trend corresponding to the first chunk, the second worker task contributes a portion of the trend corresponding to the second chunk, and the Tth worker task contributes a portion of the trend corresponding to the Tth chunk. The individually-calculated piecewise portions are assembled together by a master task to generate a smooth trendline to cover the given set of data items. The trendline can be used to make predictions based on an equation having matrix coefficients that can be computed in parallel. Strictly as one example, equation 23 (discussed above and reproduced below) gives a linear equation for computing a trend:

$$b = C_b x + C_{b0} x_0 \qquad (EQ. 23)$$

FIG. 5C depicts a plot 5C00 to display a trend given by smoothing over a large set of data items. The plot depicts the observations, fitted values, and predictions generated by execution of the R language example of FIG. 5A.

The fitted values are shown as a smoothed trend 562 and a prediction 566. The observations (e.g., data item 548) are positioned on the plot according to their value and ID.

System Architecture Overview

Additional System Architecture Examples

Figure 6:
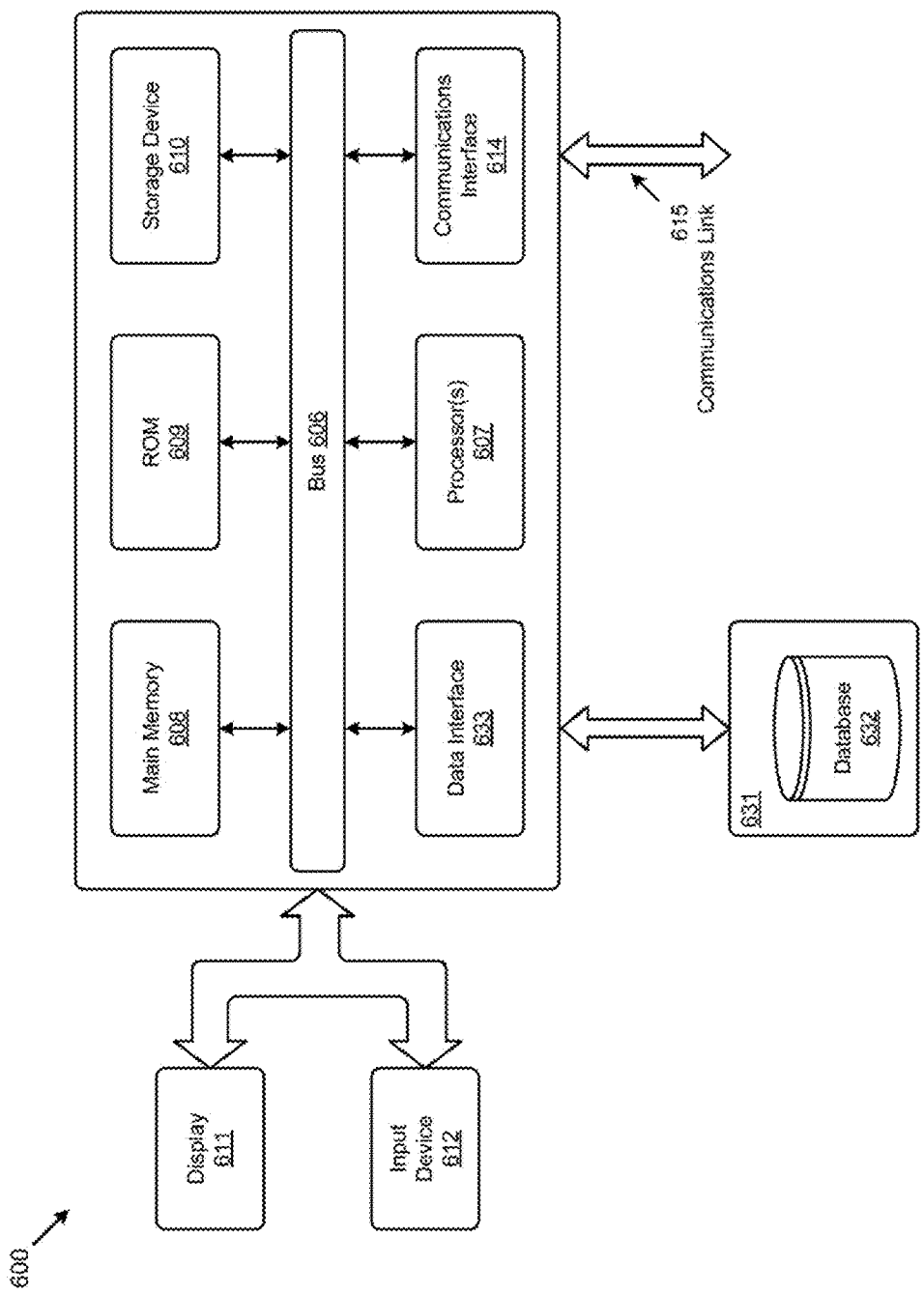
FIG. 6 depicts a block diagram of an instance of a computer system suitable for implementing embodiments of the present disclosure.

FIG. 6 depicts a block diagram of an instance of a computer system 600 suitable for implementing embodiments of the present disclosure. Computer system 600 includes a bus 606 or other communication mechanism for communicating information, which interconnects subsystems and devices, such as a processor 607, a system memory (e.g., main memory 608, or an area of random access memory RAM), a static storage device (e.g., ROM 609), a storage device 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory. Such instructions may be read into system memory from another computer readable/usable medium, such as a static storage device or a disk drive. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drives or tape drives. Volatile media includes dynamic memory, such as a RAM memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received and/or stored in storage device 610 or any other non-volatile storage for later execution. Computer system 600 may communicate through a data interface 633 to a database 632 on an external data repository 631. Data items in database 632 can be accessed using a primary key (e.g., a relational database primary key). A module as used herein can be implemented using any mix of any portions of the system memory (e.g., main memory 608), and any extent of hard-wired circuitry including hard-wired circuitry embodied as a processor 607.

Some embodiments use one or more processors corresponding to a plurality of processing entities associated with respective segments of program memory (e.g., main memory 608). A memory segment can be made accessible by an address provided by one or more concurrently executing processing entities. A processing entity within processor 607 can implement a smoothing engine to configure at least one master process and at least two worker processes as well as a chunk calculator to receive a series of data values and to divide the series of data values into a plurality of portions of data values. The processing entity within processor 607 can serve as a master process to assign a workload to at least a first worker process for calculating a first state value of a first one of the portions of data value. Also, a second processing entity within processor 607 can serve as a second worker process for calculating a second state value of a second one of the portions of data values. Using the heretofore described techniques, calculating a second state value does not depend on the first state value.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A system comprising:
   one or more processors corresponding to a plurality of processing entities, wherein the plurality of processing entities comprises at least one master entity and at least a first and second worker entities;
   one or more memory segments being concurrently accessible by at least some of the plurality of processing entities, wherein a series of data values is received into the one or more memory segments and divided into a plurality of portions of data values, wherein a portion size for the plurality of portions of data values corresponds to a size of memory available to the first and second worker entities;
   the plurality of processing entities processing the plurality of portions of data values such that the first worker entity calculates a first state value for a first data portion and the second worker entity calculates a second state value for a second data portion,
   the first worker entity is operable in parallel with the second worker entity, the first worker entity calculating a first state value corresponding to a first state at a first position of the first data portion, the second worker entity calculating a second state value corresponding to a first state at a first position of the second data portion, the first worker entity sending the first state value to the master entity, and the second worker entity sending the second state value to the master entity;
   a processing entity corresponding to the master entity assigning respective values from among the first state value and the second state value back to the first and second worker entities to calculate, in parallel using a smoothing function, computational results for remaining states of the first and second data portions; and
   the processing entity corresponding to the master entity receiving the computational results from the first and second worker entities and generating a predictive model based at least in part on the computational results.

2. The system of claim 1, wherein the first worker entity calculates the smoothing factor using a sum of errors determined based at least in part on the first state value and the second state value.

3. The system of claim 2, wherein the smoothing factor is calculated using an exponential smoothing factor objective function.

4. The system of claim 2, wherein the smoothing factor is used to predict a trend.

5. The system of claim 1, wherein the series of data values comprise a time series of observations.

6. The system of claim 1, wherein the first worker entity performs a first workload on a first node, and the second worker entity performs a second workload on a second node.

7. The system of claim 1, wherein the portions of data values are load balanced over at least two worker entities running on at least two hardware computing nodes, and wherein the master entity performs the load balancing.

8. The system of claim 1, wherein the first worker entity is run on database server, and the second worker entity is run on an external data appliance.

9. The system of claim 8, wherein the external data appliance comprises a database query processor.

10. The system of claim 8, wherein the external data appliance uses Hadoop to perform query processing.

11. A method comprising:
configuring one or more processors corresponding to a plurality of processing entities, wherein the plurality of processing entities comprises at least one master entity and at least a first and second worker entities;
populating one or more memory segments being concurrently accessible by at least some of the plurality of processing entities, wherein a series of data values is received into the one or more memory segments and divided into a plurality of portions of data values, wherein a portion size for the plurality of portions of data values corresponds to a size of memory available to the first and second worker entities; and
invoking at least some of the plurality of processing entities to process the plurality of portions of data values such that the first worker entity calculates a first state value for a first data portion and the second worker entity calculates a second state value for a second data portion,
the first worker entity is operable in parallel with the second worker entity, the first worker entity calculating a first state value corresponding to a first state at a first position of the first data portion, the second worker entity calculating a second state value corresponding to a first state at a first position of the second data portion, the first worker entity sending the first state value to the master entity, and the second worker entity sending the second state value to the master entity;
a processing entity corresponding to the master entity assigning respective values from among the first state value and the second state value back to the first and second worker entities to calculate, in parallel using a smoothing function, computational results for remaining states of the first and second data portions; and
the processing entity corresponding to the master entity receiving the computational results from the first and second worker entities and generating a predictive model based at least in part on the computational results.

12. The method of claim 11, wherein the first worker entity calculates the smoothing factor using a sum of errors determined based at least in part on the first state value and the second state value.

13. The method of claim 12, wherein the smoothing factor is calculated using an exponential smoothing factor objective function.

14. The method of claim 12, wherein the smoothing factor is used to predict a trend.

15. The method of claim 11, wherein the series of data values comprise a time series of observations.

16. The method of claim 11, wherein the first worker entity performs a first workload on a first node, and the second worker entity performs a second workload on a second node.

17. The method of claim 11, wherein the portions of data values are load balanced over at least two worker entities running on at least two hardware computing nodes, and wherein the master entity performs the load balancing.

18. The method of claim 11, wherein the first worker entity is run on database server, and the second worker entity is run on an external data appliance.

19. A computer program product, embodied in a non-transitory computer readable medium, the non-transitory computer readable medium having stored thereon a sequence of instructions which, when executed by a processor causes the processor to execute a process, the computer program product comprising:
program code for configuring one or more processors corresponding to a plurality of processing entities, wherein the plurality of processing entities comprises at least one master entity and at least a first and second worker entities;
program code for populating one or more memory segments being concurrently accessible by at least some of the plurality of processing entities, wherein a series of data values is received into the one or more memory segments and divided into a plurality of portions of data values, wherein a portion size for the plurality of portions of data values corresponds to a size of memory available to the first and second worker entities; and
program code for invoking at least some of the plurality of processing entities to process the plurality of portions of data values such that the first worker entity calculates a first state value for a first data portion and the second worker entity calculates a second state value for a second data portion,
the first worker entity is operable in parallel with the second worker entity, the first worker entity calculating a first state value corresponding to a first state at a first position of the first data portion, the second worker entity calculating a second state value corresponding to a first state at a first position of the second data portion, the first worker entity sending the first state value to the master entity, and the second worker entity sending the second value to the master entity;
a processing entity corresponding to the master entity assigning respective values from among the first state value and the second state value back to the first and second worker entities to calculate, in parallel using a smoothing function, computational results for remaining states of the first and second data portions; and
the processing entity corresponding to the master entity receiving the computational results from the first and second worker entities and generating a predictive model based at least in part on the computational results.

20. The computer program product of claim 19, wherein the first worker entity calculates the smoothing factor using a sum of errors determined based at least in part on the first state value and the second state value.

* * * * *

UNITED STATES PATENT AND TRADEMARK OFFICE
CERTIFICATE OF CORRECTION

PATENT NO.       : 9,798,589 B2
APPLICATION NO.  : 14/625963
DATED            : October 24, 2017
INVENTOR(S)      : Zhang et al.

It is certified that error appears in the above-identified patent and that said Letters Patent is hereby corrected as shown below:

On the Title Page

On page 2, Column 2, under Other Publications, Line 6, Delete "Unversitat Gottingent" and insert -- Universitat Gottingen --, therefor.

In the Specification

In Column 1, Line 12, after "entirety" insert -- . --.

In the Claims

In Column 16, Line 40, in Claim 19, delete "second value" and insert -- second state value --, therefor.

Signed and Sealed this
Nineteenth Day of June, 2018

Andrei Iancu
*Director of the United States Patent and Trademark Office*